United States Patent [19]

Woollenweber

[11] 4,224,794
[45] Sep. 30, 1980

[54] TURBINE ASSEMBLY

[75] Inventor: William E. Woollenweber, Columbus, Ind.

[73] Assignee: Cummins Engine Company, Inc., Columbus, Ind.

[21] Appl. No.: 973,738

[22] Filed: Dec. 28, 1978

[51] Int. Cl.³ .............................................. F02B 37/00
[52] U.S. Cl. ...................................... 60/602; 123/320; 138/42; 415/150; 415/151
[58] Field of Search .................. 60/602, 600, 603, 601; 251/207, 209; 137/876; 138/42, 45, 46; 415/148, 151, 157, 150; 123/97 B

[56] References Cited

U.S. PATENT DOCUMENTS

| | | | |
|---|---|---|---|
| 2,560,210 | 7/1951 | Browne | 60/602 |
| 2,621,012 | 12/1952 | Graham | 251/207 |
| 2,629,541 | 2/1953 | Couture | 60/602 |
| 2,638,117 | 5/1953 | Horn | 137/876 |
| 2,710,522 | 6/1955 | Jorgensen et al. | 60/601 |
| 3,019,778 | 2/1962 | Kloss | 123/97 B |
| 3,557,549 | 1/1971 | Webster | 60/602 |
| 3,576,102 | 5/1971 | West | 60/602 |
| 3,931,712 | 1/1976 | Keller | 60/600 |
| 4,005,579 | 2/1977 | Lloyd | 60/602 |
| 4,010,930 | 3/1977 | Sands | 251/209 |
| 4,138,849 | 2/1979 | Wilber | 60/602 |
| 4,171,936 | 10/1979 | Hageman | 60/602 |

*Primary Examiner*—Michael Koczo
*Assistant Examiner*—Rae Cronmiller
*Attorney, Agent, or Firm*—Neuman, Williams, Anderson & Olson

[57] ABSTRACT

A turbine assembly is provided for use on an internal combustion engine such as a diesel engine having conventional intake and exhaust manifolds. The assembly includes a hollow section which has an inlet communicating with the exhaust manifold, and an outlet communicating with an exhaust gas entry into a chamber in which a turbine wheel is mounted. Rotatably mounted within the hollow section is a rotor which is adjustable to various selected positions. When in a first selected position, the rotor permits substantially unrestricted exhaust gas flow through the assembly. When in a second selected position, a predetermined amount of exhaust gas is diverted from the turbine wheel chamber through a bypass passageway formed in the hollow section. The end of the bypass passageway terminates downstream of the turbine wheel chamber. When in a third selected position of adjustment, the rotor effects substantial blockage of the exhaust gas flow through the assembly.

11 Claims, 8 Drawing Figures

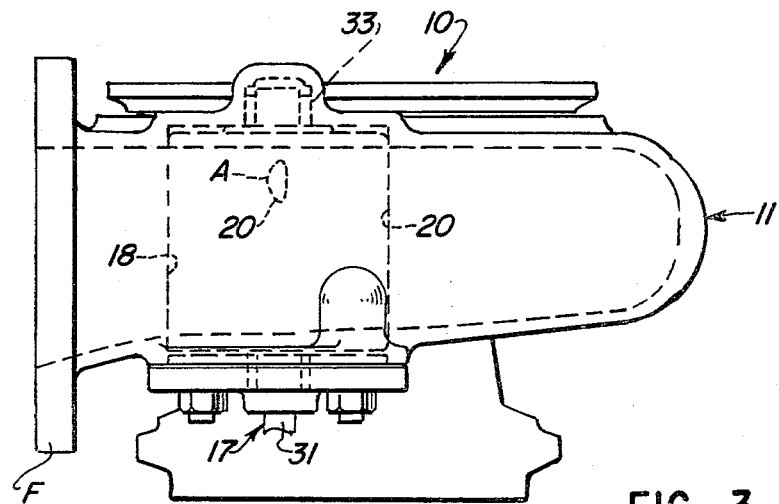
FIG. 3
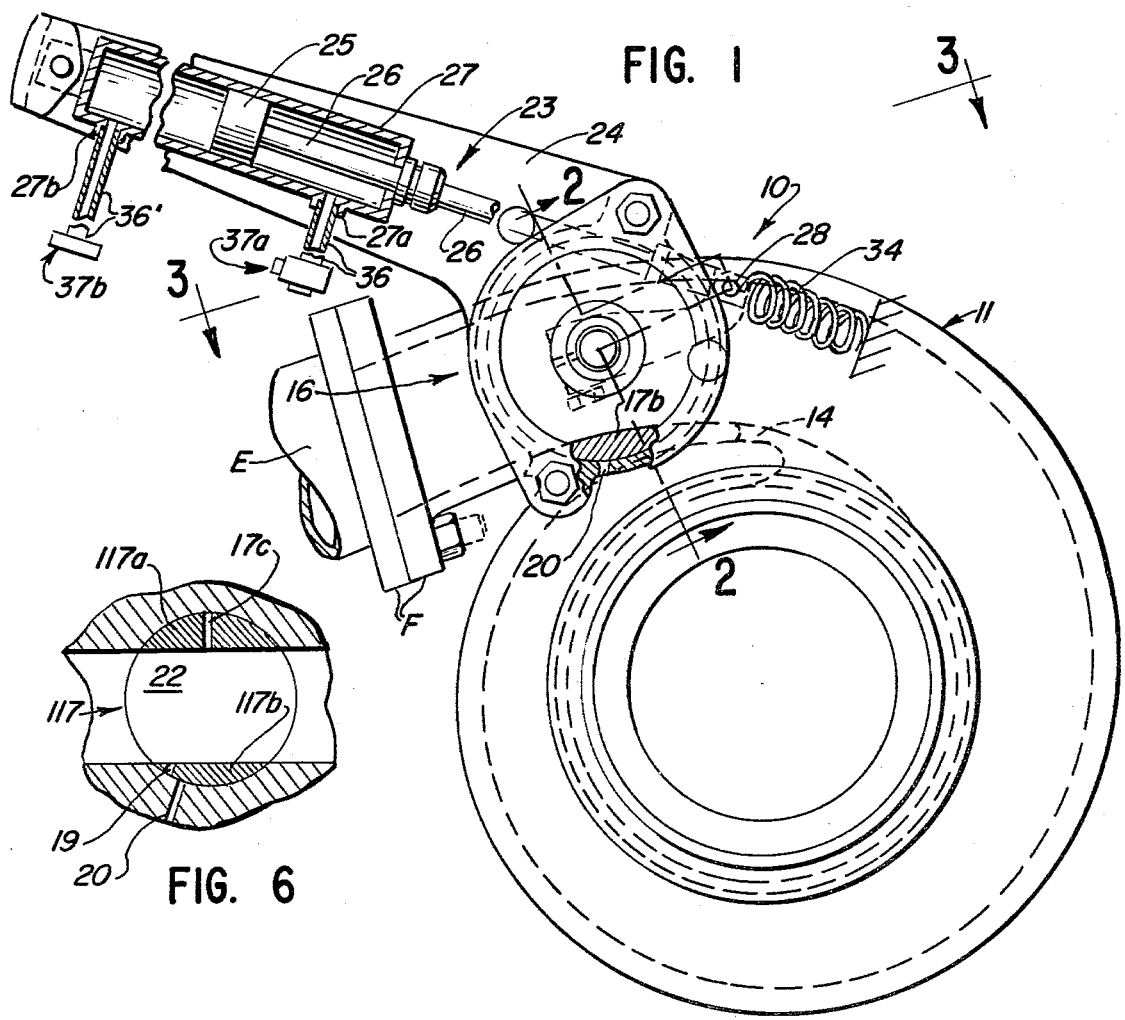
FIG. 1
FIG. 6

TURBINE ASSEMBLY

BACKGROUND OF THE INVENTION

In internal combustion engines such as diesels utilizing turbochargers, variations in engine speeds and torque demands are oftentimes important factors bearing on the efficient and safe operation of an engine when operating within its normal operating range. When operating at or above the high end of such operating range, internal pressures within the engine become very high whereby special high pressure seals and the like are required in order to prevent frequent and serious breakdowns of the engine. Furthermore, the initial and maintenance costs of such engines are inordinately high.

In an attempt to overcome these problems, various apparatus have heretofore been provided which cause a portion of the exhaust gas to bypass the turbine particularly during certain operating speeds. Such apparatus, however, because of various inherent design characteristics have been beset with one or more of the following shortcomings: (a) they are initially expensive and require substantial maintenance and service costs; (b) they are bulky and awkward to install; (c) they are incapable of effecting exhaust braking of the engine when required; and (d) they are incapable of effectively operating under engine operating conditions which vary over a wide range.

SUMMARY OF THE INVENTION

Thus, it is an object of the invention to provide a turbine assembly which avoids all of the aforementioned shortcomings.

It is a further object of the invention to provide a turbine assembly which may be readily incorporated on either existing or new internal combustion engines.

It is a further object of the invention to provide a turbine assembly which is capable of being utilized with internal combustion engines which vary in size and operating characteristics over a wide range.

It is a still further object of the invention to provide a turbine assembly which significantly reduces undesirable exhaust emissions during rapid acceleration of the engine.

It is a still further object of the invention to provide a turbine assembly wherein there is more rapid response of the engine to throttle adjustment.

Further and additional objects will appear from the description, accompanying drawings and appended claims.

In accordance with one embodiment of the invention an improved turbine assembly is provided for use on an internal combustion engine having conventional intake and exhaust manifolds. The assembly includes a housing having a chamber in which a turbine wheel is rotatably mounted. The chamber is provided with an exhaust gas entry and an exhaust gas exit. A hollow section is formed in the housing upstream of the exhaust gas entry. The hollow section includes an inlet communicating with the exhaust manifold and an outlet communicating with the gas entry of the chamber. A rotor is disposed within the hollow section for movement between selected positions of adjustment. A bypass passageway is provided having one end thereof terminating within the hollow section and adjacent the inlet thereof. The other end of the bypass passageway terminates downstream of the exhaust gas exit of the housing chamber. When the rotor assumes a first selected position of adjustment, substantially unrestricted exhaust gas flow occurs through the outlet of the hollow section. When, however, the rotor is disposed in a second selected position of adjustment, a predetermined amount of the exhaust gas flow is diverted by the rotor through the bypass passageway while the remainder of the gas flows through the outlet of the hollow section. Upon the rotor assuming a third selected position of adjustment, gas flow through the hollow section and bypass passageway is substantially blocked by the rotor thereby effecting exhaust braking of the engine.

DESCRIPTION

For a more complete understanding of the invention reference should be made to the drawings wherein:

FIG. 1 is a fragmentary side elevational view of one form of the improved turbine assembly.

FIG. 3 is a fragmentary top plan view of FIG. 1.

Figure 4A:
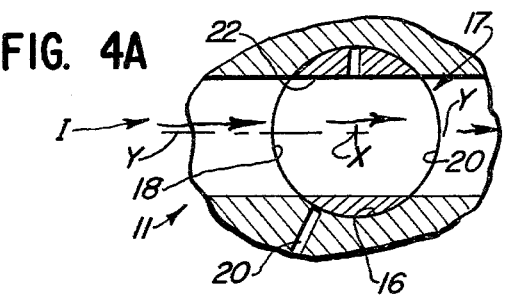

FIGS. 4A, B and C are diagrammatic views of the rotor and hollow section showing the rotor disposed, respectively, in first, second and third selected positions of adjustment.

Figure 5:
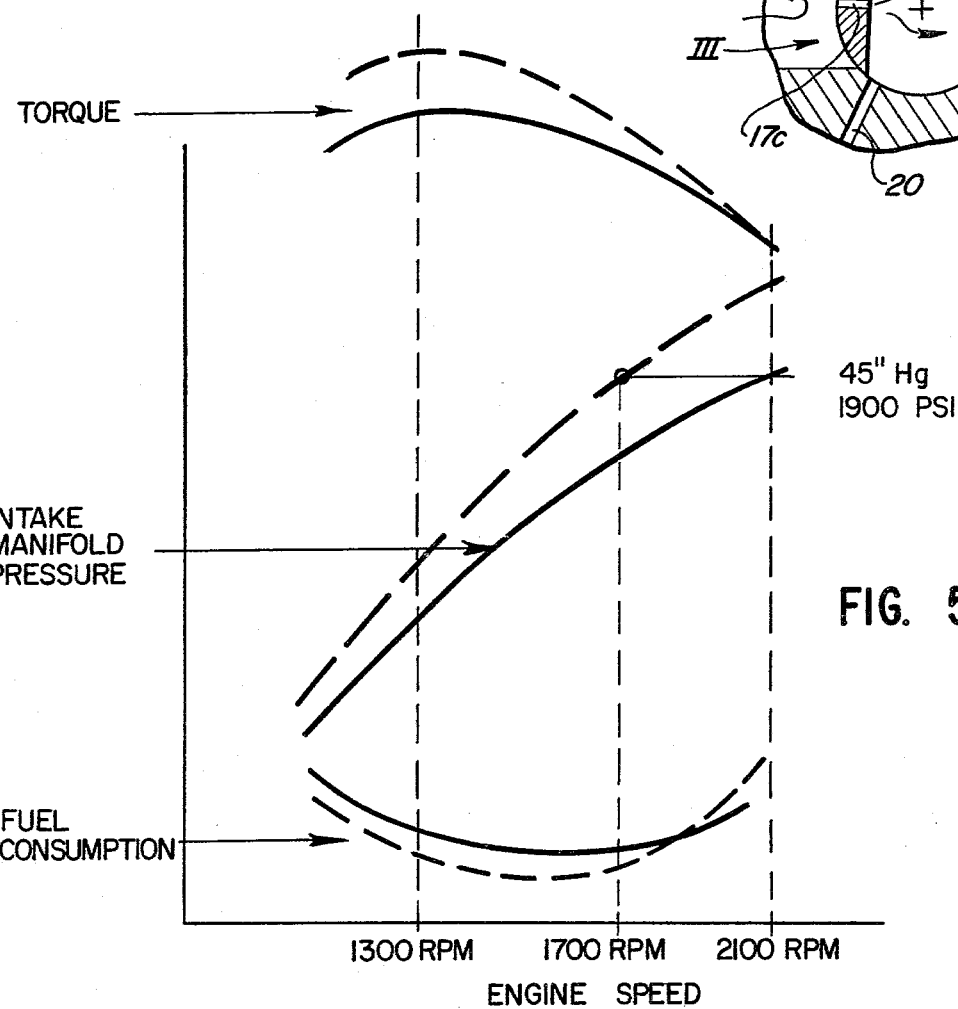

FIG. 5 is a chart wherein torque, intake manifold pressure and fuel consumption are plotted against engine speed for an internal combustion engine operating under two operating conditions where the torque demand is increased from 20% to 30% over an engine speed range from approximately 1300 RPM to approximately 2100 RPM.

FIG. 6 is similar to FIG. 4A but showing a modified form of rotor.

Figure 2:
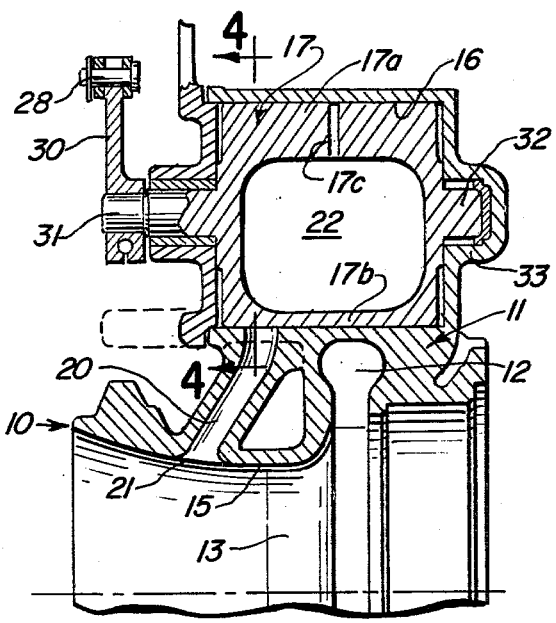
FIG. 2 is a fragmentary sectional view taken along line 2—2 of FIG. 1.

Referring now to the drawings FIGS. 1–3 one form of an improved turbine assembly 10 is shown which is adapted for use on an internal combustion engine having a conventional intake manifold not shown and an exhaust manifold E, see FIG. 1. For purposes of describing the operational and structural details of the assembly, the engine will be considered as a diesel type. The assembly 10 in the illustrated embodiment includes a housing or casing 11 which is provided with a chamber 12 in which a conventional turbine wheel 13 is rotatably mounted. The housing may have a volute configuration and is provided with a peripheral exhaust gas entry 14 adjacent the chamber and an axially disposed exhaust gas exit 15. Formed in the housing and disposed upstream from the entry 14 is a hollow section 16 in which is rotatably mounted a rotor 17, see FIGS. 4A-C. If desired, the hollow section may be a separate component from the housing, or may be made a part of the exhaust manifold E. Neither of the latter two constructions departs from the scope of the invention to be hereinafter described.

The inlet side 18 of the hollow section 16 communicates with the exhaust manifold E and is secured thereto by suitable fasteners or clamps, not shown, engaging external mating flanges F formed on the manifold and housing. The outlet side 20 of the hollow section 16 communicates with the gas entry 14 to the chamber 12. The hollow section 16 preferably has a cylindrical configuration with the axis X thereof substantially transversely disposed relative to the direction of gas flow through the hollow section. The axis X is offset a small amount relative to the centerline Y-Y of the inlet side and outlet side of the hollow section 16, see FIG. 4A, for a purpose to be hereinafter described.

Extending angularly from the hollow section 16 is a bypass passageway 20 which terminates at a location 21 disposed downstream of the exit 15 formed in housing 11. As seen in FIG. 4A the opposite end of the passageway 20 is disposed adjacent the inlet 18 to the hollow section 16.

Rotor 17 is provided with a primary passage 22 which extends therethrough. The size and configuration of passage 22 is such that, when the rotor is in a first selected position of adjustment I, FIG. 4A, the gas flow through the assembly will be substantially unrestricted.

In a modified form of rotor 117 shown in FIG. 6 a secondary passage 19 is provided which extends angularly from passage 22 and is of smaller cross-sectional area. The function of passage 19 will become apparent from the discussion hereinafter.

Figure 4B:
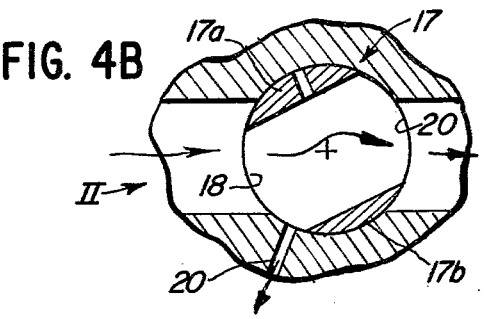

When the rotor 17 is rotated in a counterclockwise direction about axis X a few degrees (less than 15°) from position I to a second selected position II, FIG. 4B, the bypass passageway 20 is uncovered thereby causing a small predetermined amount of the flowing exhaust gas to be diverted through the passageway 20 and thus, circumvent the turbine wheel chamber 12. When rotor 117 is utilized in place of rotor 17 and is rotated a like amount in a counterclockwise direction, the secondary passageway 19 will be aligned with the end of bypass passageway 20 and a diversion of a small predetermined amount of the gas flow will occur.

It should be noted with either form of rotor, that when the rotor is in the first selected position I, the end of passageway 20 is sealed closed by the rotor. The amount of exhaust gas being diverted through passageway 20 will depend upon the cross-sectional configuration of the passageway and the relative position of the rotor at a given time. As seen in FIG. 3, the passageway 20 may have a substantial triangular configuration with an apex A thereof being the first portion to be uncovered when the rotor is moved from position I to position II. Thus, the amount of flow diversion can be carefully controlled to meet a particular operating condition of the engine.

Figure 4C:
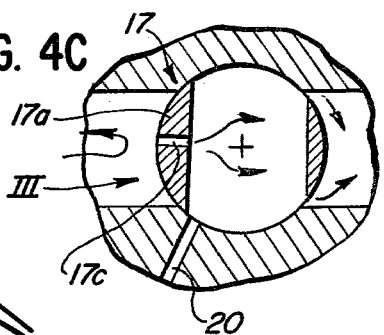

FIG. 4C shows the rotor 17 in a full exhaust braking condition (third selected position III) wherein exhaust gas flow through the assembly is substantially blocked by a portion 17a of the rotor. When the rotor moves from position I to position III or vice versa, it moves through a sector of approximately 90°. Portion 17a coacts with an opposing portion 17b to define the primary passage 22. It will be noted that portion 17a may be provided with a small bleeder port 17c through which a small amount of the exhaust gas will continue to flow so as to maintain the turbine wheel 13 at idling speed. By maintaining the wheel at such a speed, proper sealing of chamber 12 can be maintained by the various seals associated with the wheel. It will be noted in FIG. 4C that portion 17a is of such size that it sealingly contacts the segment of the hollow section 16 which is circumjacent the inlet 18.

Portion 17b of rotor 17 is smaller than portion 17a due to the axis X being offset and is of such size and shape relative to the outlet 20, that when the rotor is in position III, the exhaust gas which bleeds through port 117c will flow through the clearance formed between the periphery of portion 17b and the outlet 20. In the case of rotor 117, the exhaust gas can flow through the secondary passage 19 as well as through the clearance between portion 117b and outlet 20, when rotor 117 is in position III.

Thus, it will be observed with but a single rotor 17 or 117 two distinct and important operations can be performed: (a) the amount of exhaust gas flow to the turbine wheel chamber can be readily controlled and (b) effective exhaust braking of the engine can be accomplished thereby increasing significantly safe operation of the engine particularly where the engine is incorporated in a highway vehicle (e.g., semitrailer truck). With a highway vehicle, exhaust braking is frequently utilized to supplement hydraulically or pneumatically activated wheel brakes.

FIG. 1 discloses a piston-cylinder unit 23 which may be adjustably mounted on a suitable bracket 24 carried on the exterior of housing 11 of extending from the engine block or the like. The piston 25 of the unit 23 has an elongated rod 26 protruding from one end of the cylinder 27 and having an end thereof pivotally connected at 28 to a lever 30. The lever is affixed to an axial stub 31 carried by rotor 17 or 117, see FIG. 2. A second axial stub 32 extends from the opposite side of the rotor and is supported by a journal bearing 33 provided in the hollow section of the housing.

Also, connected to lever 30 is one end of a spring 34 which biases the rotor to normally assume the first selected position I (a non-braking position).

The relative position of the rotor within the hollow section is determined by the position of the piston head 25 within the cylinder 27. As seen in FIG. 1, cylinder 27 is provided with a pair of longitudinally spaced ports 27a, 27b. Ports 27a, 27b are connected by hose or duct sections 36, 36' to multi-position valves 37a, 37b. Valve 37a, when in one position, causes port 27a to be connected to a source of pneumatic pressure, not shown, which is normally provided on a vehicle to effect actuation of the wheel braking discs or shoes. When valve 37a is adjusted in a second position, port 27a is connected directly to the intake manifold and the pressure which exists therein. When valve 37a is connected to the source of pneumatic pressure, valve 37b is connected to the exhaust manifold E and the gas pressure existing therein. While the valves are in these positions high pneumatic pressure acts on the right side of piston head 25 (see FIG. 1) and overcomes both the spring (34) force and exhaust manifold pressure and thereby moves the piston head and associated mechanism to the left causing rotor 17 to take the position shown in FIG. 4C; namely, the braking mode.

When valve 37a is connected to the intake manifold, valve 37b is opened to the atmosphere. This is the exhaust gas bypass mode of the apparatus. When the intake manifold pressure reaches a desired value, the force on the right side of piston head 25 overcomes the spring force and moves the rotor to the left, uncovering bypass passageway 20. When an excessive amount of exhaust gas is bypassed around the turbine wheel chamber 12, the intake manifold pressure will be reduced thereby allowing the spring (34) force to move the piston head 25 to the right, closing off a portion of passageway 20 and allowing the intake manifold pressure to return to its original value. Thus, the method of control described produces a constant intake manifold pressure over the upper end of the engine operating speed range as shown in FIG. 5. This limitation of intake manifold pressure will limit the maximum cylinder pressure to safe values while still allowing the engine to develop more torque at the lower end of the operating speed range.

Movement of the rotor to position III may be effected by a manual control, not shown, disposed within the cab of the vehicle, which will regulate the amount of pneumatic pressure to be exerted on the piston head 25 when valve 37a is in its first position.

As previously mentioned, one of the primary functions of the turbine assembly is to limit the intake manifold pressure in order for the engine to meet a certain operational demand. Furthermore, as seen in FIG. 5, fuel consumption is reduced for approximately 80% of the engine operating speed range (e.g., 0 to 2100 rpm). The reduced fuel consumption over the low speed range (e.g., 0 to 1800 rpm) occurs by reason of the increased intake manifold pressure, which, in turn, causes an increase in the air to fuel ratio of the combustible mixture within the engine cylinders. It has been found that such an air to fuel ratio results in more complete combustion and thus, a decrease in undesirable exhaust emissions.

In the chart of FIG. 5 the normal operating characteristics of a conventional diesel engine are shown in solid lines and the operating characteristics of the same engine embodying the improved turbine assembly are shown in broken lines. It will be observed that in torque output and fuel consumption over an engine speed range up to approximately 1700 rpm there is a noticeable improvement. In addition to such improvement the maximum pressure attained within the engine cylinders is effectively controlled.

Thus, it will be seen that a simple, compact, yet effective turbine assembly has been provided which will result in improved engine performance over a substantial part of the engine operating speed range, and at the same time serve to obtain effective and safe exhaust braking when desired. Because of the rotor being capable of being modulated by the intake manifold pressure, the engine is more responsive to throttle adjustments.

The size and configuration of the various components comprising the improved turbine assembly may vary from that shown and will depend to a certain extent on the physical dimensions of the engine on which it is mounted.

I claim:

1. A turbine assembly for use on an internal combustion engine having an intake manifold and an exhaust manifold, said assembly comprising a housing having a chamber in which a turbine wheel is rotatably mounted, said housing chamber being provided with an exhaust gas entry and an exhaust gas exit; a hollow section disposed upstream of said housing chamber and having an inlet for communicating with the exhaust manifold, an outlet communicating with the chamber entry, and a bypass passageway having one end thereof connected to said hollow section intermediate said inlet and outlet, and a second end thereof terminating downstream of said gas exit; and a rotor mounted within said hollow section for movement between selected positions of adjustment, said rotor, when in a first selected position of adjustment, effecting substantially unrestricted exhaust gas flow from the exhaust manifold to the housing chamber through the hollow section; and when said rotor is disposed in a second selected position of adjustment, a predetermined amount of the exhaust gas flow is diverted through the bypass passageway while the remainder thereof passes through the hollow section to the housing chamber.

2. The turbine assembly of claim 1 wherein the hollow section forms a part of said housing and is disposed upstream of said chamber.

3. The turbine assembly of claim 1 wherein said rotor is adjustable to a third selected position whereby a substantial exhaust gas flow through the hollow section and the bypass passageway is blocked effecting exhaust braking of the engine, and only a minor gas flow through the hollow section is permitted to maintain rotation of the turbine wheel at idling speed.

4. The turbine assembly of claim 1 wherein the one end of the bypass passageway is disposed in close proximity to the hollow section inlet.

5. The turbine assembly of claim 4 wherein the passageway one end is substantially sealed closed by said rotor when the latter is disposed in either the first or third selected position of adjustment.

6. The turbine assembly of claim 3 wherein the rotor rotates through a sector of substantially 90° when moving between said first and third selected positions of adjustment.

7. The turbine assembly of claim 6 wherein the rotor rotates through a sector of less than about 15° when moving between first and second selected positions of adjustment.

8. The turbine assembly of claim 7 wherein the one end of the bypass passageway is uncovered to the fullest extent by the rotor while the latter is rotated from the second selected position of adjustment towards the third selected position of adjustment.

9. The turbine assembly of claim 1 wherein the rotor is provided with a primary passageway extending substantially transversely of the axis of rotation of said rotor and through which the exhaust gas is adapted to flow in a substantially unrestricted manner, when said rotor is disposed in said first selected position; and a secondary passageway extending angularly from said primary passageway and adapted to communicate with said bypass passageway when said rotor is disposed in said second selected position of adjustment; said secondary passageway having a cross-sectional area substantially less than that of said primary passageway.

10. The turbine assembly of claim 1 wherein the rotor includes operative means disposed externally of said hollow section for effecting selective adjustment of said rotor; said means being adapted to be responsive to the intake manifold pressure.

11. The turbine assembly of claim 10 wherein said operative means includes a piston-cylinder unit and said rotor is biased to assume said first selected position of adjustment.

* * * * *